(No Model.)

A. M. BOLLINGER.
DRILL AND SUCKER ROD JOINT.

No. 317,493. Patented May 12, 1885.

Witnesses:
T. G. Kelly
J. A. Beatty

Inventor.
A. M. Bollinger
per M. E. Harrison
Attorney

UNITED STATES PATENT OFFICE.

ALEXANDER M. BOLLINGER, OF KELLY'S STATION, PENNSYLVANIA.

DRILL AND SUCKER ROD JOINT.

SPECIFICATION forming part of Letters Patent No. 317,493, dated May 12, 1885.

Application filed March 21, 1885. (No model.)

*To all whom it may concern:*

Be it known that I, ALEXANDER M. BOLLINGER, a citizen of the United States, residing at Kelly's Station, in the county of Armstrong and State of Pennsylvania, have invented a new Device for Securing the Joints of such Sectional Tools as are Used in the Drilling, Reaming, &c., of deep Artesian Wells, of which the following is a specification.

Heretofore the several sections frequently became unscrewed and detached the one from the other and irrecoverably lost in the well.

The object of my invention is to provide a simple and effective means whereby the joints may be made perfectly secure against accidental disengagement, and to this end the adjacent end of each rod comprising the body of the drill is formed with a vertical outside recess, that together constitute a suitable elongated cavity, into which is fitted a spring lock-bolt that shall operate to prevent any accidental unscrewing of the joint.

The nature of my invention and its mechanical structure will be readily understood from the following description, taken in connection with the accompanying drawings, wherein—

Figure 1:
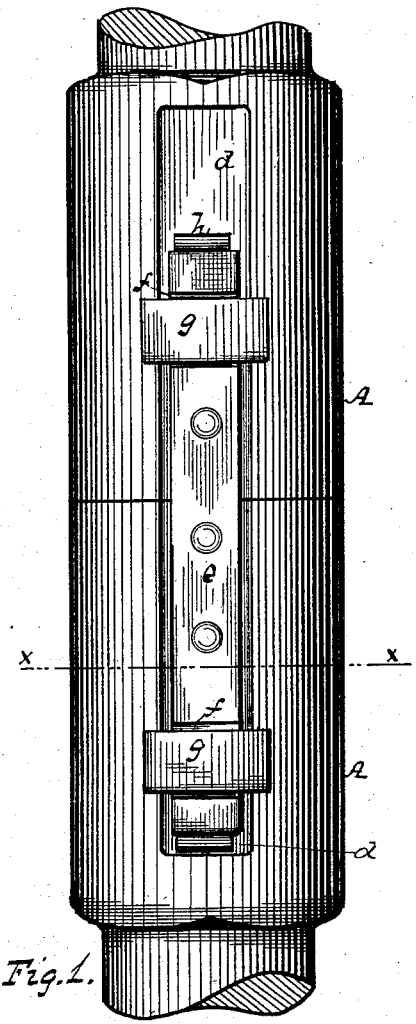
Figure 2:
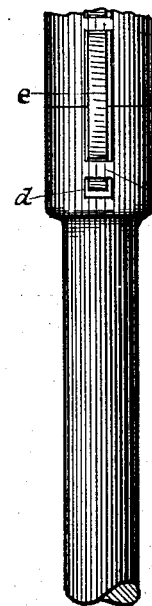
Figure 2:
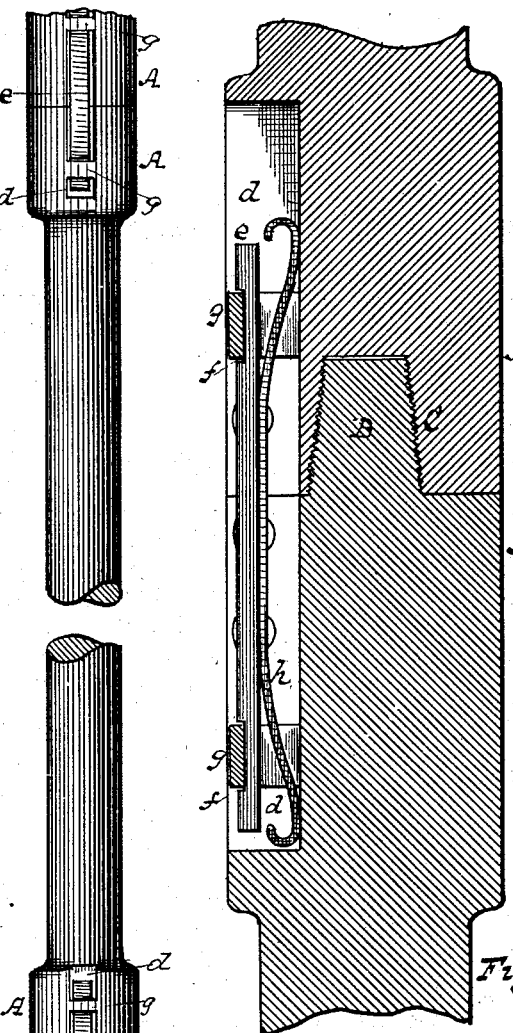
Figure 3:
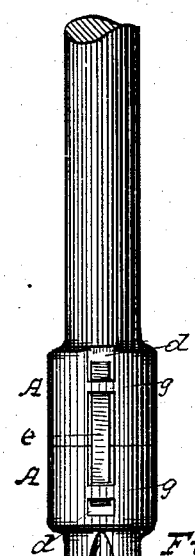
Figure 4:
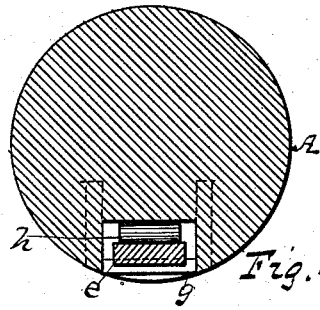

Figure 1 represents in front elevation so much of a well-drill as is necessary to show one joint thereof, that is provided with a locking-bolt constructed and applied in accordance with my invention; Fig. 2, a transverse vertical section of the same; Fig. 3, a drill-rod composed of several sections, each joined to the other and to a drill by connections provided with my improved safety contrivance; Fig. 4, a transverse section on the line $x\ x$.

To give my invention bodily form and put the same into practice, the enlarged ends A of each section are connected together by means of a tapering male screw, B, on one part uniting with a corresponding female screw, C, in the other, after the manner usual in such cases; but in order to secure the joint against any accidental unscrewing and disengagement of its parts, I provide each enlargement A with a deep recess, $d$, so constructed and arranged as that when the rods are screwed together the said recesses shall coincide and form one long cavity, in which is placed a suitable bolt, $e$, that shall extend across the joint and securely lock the same. This bolt $e$ has near each end thereof a square-shouldered notch, $f$, fitting over a broad staple or transverse bar, $g$, affixed within the recess of each rod, and that serve to keep the bolt in place. By means of a curved spring, $h$, riveted to the bolt $e$, it is pressed outwardly, forcing its notches to engage with their respective cross-bars in such a manner as to prevent its change of position.

To disconnect a joint the bolt $e$ can be pressed inwardly until its notches are released from the cross-bars $g$, when it may be raised in the direction of its length and withdrawn from the cavity, leaving the joint in a condition to be unscrewed.

Having thus described my invention, I claim—

In a sectional drill-rod, the combination consisting of the enlarged ends united by means of a tapering male and female screw, a recess cut in the outside of each enlargement, a notched bolt therein extending across the joint, and locking the same, a spring riveted to said bolt and operating to force the same outwardly, and a staple or bar across each recess to hold the bolt in place by engaging with its notches, and prevent any movement of the bolt other than that necessary for its release by a compression of the spring.

ALEXANDER M. BOLLINGER.

Witnesses:
JOSEPH MCGREGOR,
JAMES CUNNINGHAM.